United States Patent
Neema et al.

(10) Patent No.: US 11,042,610 B1
(45) Date of Patent: Jun. 22, 2021

(54) ENABLING INTEGRITY AND AUTHENTICITY OF DESIGN DATA

(71) Applicant: Xilinx, Inc., San Jose, CA (US)

(72) Inventors: Hem C. Neema, San Jose, CA (US); Sonal Santan, San Jose, CA (US); Bin Ochotta, Mountain View, CA (US)

(73) Assignee: XILINX, INC., San Jose, CA (US)

( * ) Notice: Subject to any disclaimer, the term of this patent is extended or adjusted under 35 U.S.C. 154(b) by 239 days.

(21) Appl. No.: 15/724,942

(22) Filed: Oct. 4, 2017

(51) Int. Cl.
| | |
|---|---|
| *G06F 21/00* | (2013.01) |
| *G06F 21/12* | (2013.01) |
| *H04L 9/32* | (2006.01) |
| *G06F 21/77* | (2013.01) |
| *H04L 29/06* | (2006.01) |
| *H04W 12/06* | (2021.01) |
| *H04W 12/10* | (2021.01) |

(52) U.S. Cl.
CPC ............ *G06F 21/123* (2013.01); *G06F 21/77* (2013.01); *H04L 9/3234* (2013.01); *H04L 63/0853* (2013.01); *H04W 12/06* (2013.01); *H04W 12/10* (2013.01)

(58) Field of Classification Search
CPC .. G06F 9/30043; G06F 9/4411; G06F 21/123; G06F 21/77; H04L 63/08; H04L 63/0807; H04L 63/0853; H04L 9/3234; H04W 12/06; H04W 12/10
See application file for complete search history.

(56) References Cited

U.S. PATENT DOCUMENTS

| | | | |
|---|---|---|---|
| 5,349,249 A | 9/1994 | Chiang et al. | |
| 6,118,869 A * | 9/2000 | Kelem | G11C 7/24 |
| | | | 380/44 |
| 6,253,326 B1 * | 6/2001 | Lincke | H04L 29/06 |
| | | | 726/12 |
| 6,499,124 B1 | 12/2002 | Jacobson | |
| 6,873,177 B1 | 3/2005 | Wennekamp et al. | |
| 6,894,527 B1 | 5/2005 | Donlin et al. | |
| 7,180,776 B1 | 2/2007 | Wennekamp et al. | |
| 7,243,227 B1 | 7/2007 | Knapp | |
| 7,345,502 B1 | 3/2008 | Lakkapragada et al. | |
| 7,536,559 B1 | 5/2009 | Jenkins, IV et al. | |

(Continued)

OTHER PUBLICATIONS

Lin Li et al., A Rule-based Methodology for Hardware Configuration Validation in Embedded Systems, May 2016, ACM, pp. 180-189. (Year: 2016).*

(Continued)

*Primary Examiner* — Luu T Pham
*Assistant Examiner* — Fahimeh Mohammadi
(74) *Attorney, Agent, or Firm* — Patterson + Sheridan, LLP

(57) ABSTRACT

Embodiments herein describe techniques for validating binary files used to configure a hardware card in a computing system. In one embodiment, the hardware card (e.g., an FPGA) includes programmable logic which the binary file can configure to perform a specialized function. In one embodiment, multiple users can configure the hardware card to perform their specialized tasks. For example, the computing system may be server on the cloud that hosts multiple VMs or a shared workstation. Permitting multiple users to directly configure and use the hardware card may present a security risk. To mitigate this risk, the embodiments herein describe techniques for validating encrypted binary files.

17 Claims, 5 Drawing Sheets

(56) References Cited

U.S. PATENT DOCUMENTS

| | | | |
|---|---|---|---|
| 7,757,294 B1 | 7/2010 | Simkins | |
| 7,809,544 B1 | 10/2010 | Trimberger | |
| 7,952,387 B1* | 5/2011 | Frazer | G06F 30/34 |
| | | | 326/38 |
| 7,984,304 B1* | 7/2011 | Waldspurger | G06F 21/565 |
| | | | 713/187 |
| 8,074,077 B1 | 12/2011 | Neema et al. | |
| 8,355,502 B1 | 1/2013 | Donlin et al. | |
| 8,539,254 B1* | 9/2013 | Bridgford | H04L 67/34 |
| | | | 713/194 |
| 2006/0212706 A1* | 9/2006 | Jiang | H04L 9/0825 |
| | | | 713/176 |
| 2008/0270805 A1* | 10/2008 | Kean | G06F 21/76 |
| | | | 713/189 |
| 2009/0060197 A1* | 3/2009 | Taylor | H04L 9/0618 |
| | | | 380/277 |
| 2009/0172265 A1* | 7/2009 | Park | G06F 16/1847 |
| | | | 711/103 |
| 2010/0211787 A1* | 8/2010 | Bukshpun | H04L 9/065 |
| | | | 713/170 |
| 2012/0260102 A1* | 10/2012 | Zaks | G06F 21/72 |
| | | | 713/189 |
| 2013/0290729 A1* | 10/2013 | Pettigrew | G06F 21/51 |
| | | | 713/187 |
| 2014/0064484 A1* | 3/2014 | Shamoon | H04N 21/4627 |
| | | | 380/201 |
| 2014/0258717 A1* | 9/2014 | Baek | G06F 21/6218 |
| | | | 713/165 |
| 2017/0169216 A1* | 6/2017 | Boehm | G06F 3/0622 |
| 2018/0089343 A1* | 3/2018 | Atta | G06F 30/327 |
| 2018/0091484 A1* | 3/2018 | Atta | H04L 9/3247 |

OTHER PUBLICATIONS

Lilian Bossuet et al., Architectures of Flexible Symmetric Key Crypto Engines—A Survey: From Hardware Coprocessor to Multi-Crypto-Processor System on Chip, Aug. 2013, ACM, vol. 45, No. 4, Article 41, p. 41:1-41:32. (Year: 2013).*

Rajat Subhra Chakraborty et al., Hardware Trojan Insertion by Direct Modification of FPGA Configuration Bitstream, Feb. 14, 2013, IEEE, vol. 30, Issue: 2, pp. 45-54. (Year: 2013).*

Lok-Won Kim et al., Dynamic Function Replacement for System-on-Chip Security in the Presence of Hardware-Based Attacks, Apr. 23, 2014, IEEE, vol. 63, Issue: 2; pp. 661-675. (Year: 2014).*

* cited by examiner ically related to validating a binary file used to configure a hardware card in a computing system.

ENABLING INTEGRITY AND AUTHENTICITY OF DESIGN DATA

TECHNICAL FIELD

Examples of the present disclosure generally relate to validating a binary file used to configure a hardware card in a computing system.

BACKGROUND

Hardware cards may be attached to a computing system as peripheral devices to provide ancillary functions or to perform specialized functions. For example, a graphics card may be inserted into a computing system to render images or generate complicated animations. Further, a hardware card can include programmable integrated circuits (e.g., a field programmable gate array (FPGA), programmable logic device (PLD)) which can be configured to include accelerators which perform specialized operations. For example, the hardware card may include a graphics accelerator, crypto-accelerator, video processor accelerator, a neural network for machine learning, and the like.

SUMMARY

Techniques for using an encrypted binary file to configure a hardware card are described. One example is a method that includes receiving an encrypted binary file, the binary file comprising a header, encryption data, and a bit stream, and where the header indicates respective locations of the encryption data and the bit stream within the binary file. The method includes decrypting the encryption data, and upon determining the binary file is valid based on the decrypted data, transmitting the binary file to a hardware card attached to a host computing system. The method includes configuring hardware logic in the hardware card based on the bit stream.

One example described herein is a host computing system that includes a hardware card comprising hardware logic and a validator configured to receive an encrypted binary file, the binary file comprising a header, encryption data, and a bit stream, where the header indicates respective locations of the encryption data and the bit stream within the binary file. The validator is configured to decrypt the encryption data and, upon determining the binary file is valid based on the decrypted data, transmit the binary file to the hardware card, where the hardware logic is configured based on the bit stream.

One example described herein is a computer readable storage medium that includes computer-readable program code for verifying an encrypted binary file, where, when executed by a computing processor, the computer-readable program code performs an operation that includes receiving the binary file, the binary file comprising a header, encryption data, and a bit stream, where the header indicates respective locations of the encryption data and the bit stream within the binary file. The operation also includes decrypting the encryption data and, upon determining the binary file is valid based on the decrypted data, transmitting the binary file to a hardware card attached to a host computing system. The operation includes configuring hardware logic in the hardware card based on the bit stream.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
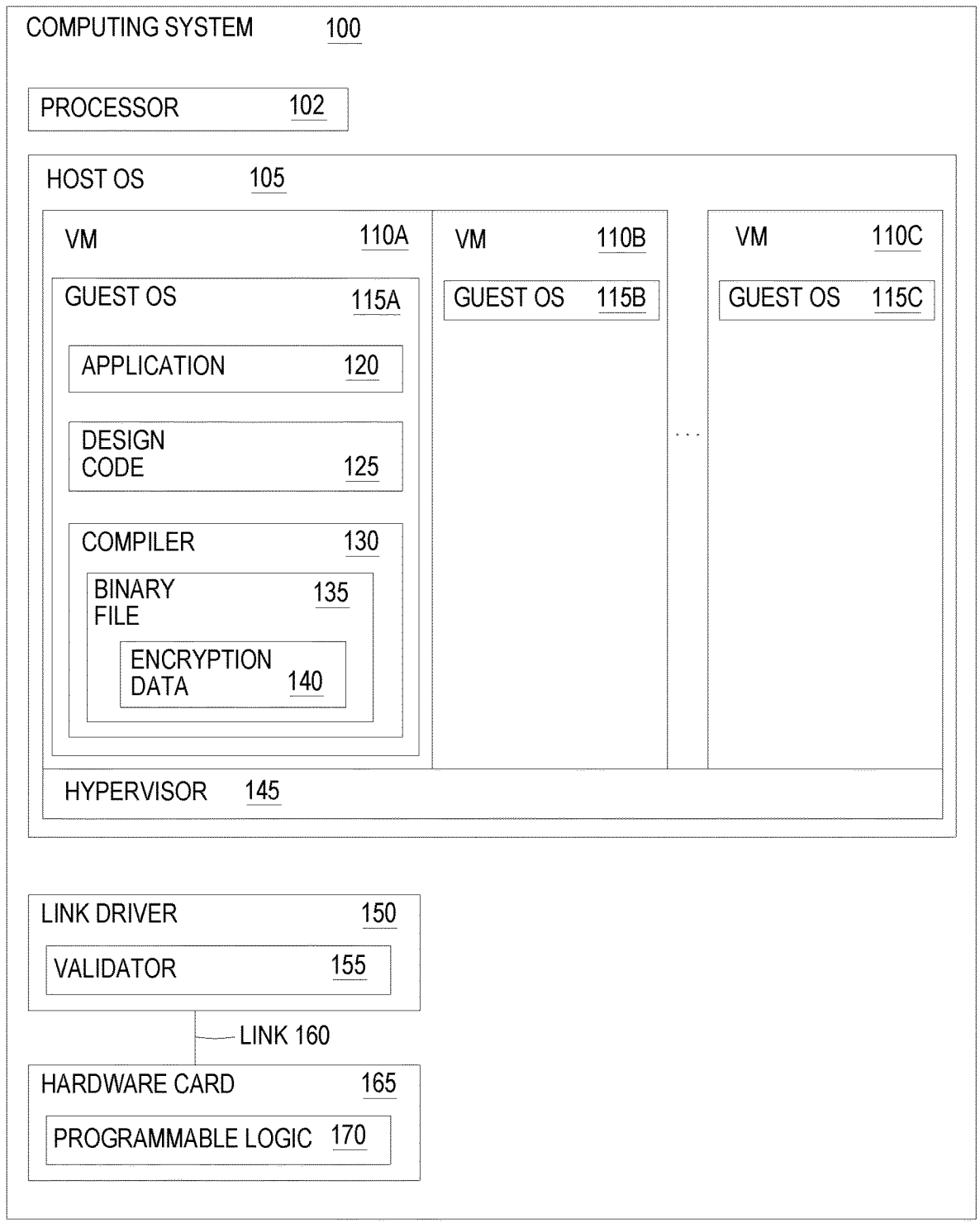
FIG. 1 is a block diagram of a computing system that uses an encrypted binary file to configure a hardware card, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for validating binary files used to configure a hardware card in a computing system. In one embodiment, the hardware card (e.g., an FPGA) includes programmable logic which the binary file can configure to perform a specialized function such as an accelerator. In one embodiment, multiple users can configure the hardware card to perform their specialized tasks. For example, the computing system may be a server on the cloud that hosts multiple VMs or a shared workstation.

However, permitting multiple users to directly configure and use the hardware card may present a security risk. For example, a non-authorized user may try to transmit a binary file to the hardware card, or the binary file generated by an authorized user may be intercepted and changed by an intermediary. To mitigate these risks, the embodiments herein describe techniques for encrypting binary files. When an encrypted binary file is received, the computing system can decrypt the binary files to validate that the file was created by an authorized user and was not tampered with before reaching the host computer. If valid, the host computer uses the binary file to configure programmable logic on the hardware card which enables the card to perform a specialized task or operation.

FIG. 1 is a block diagram of a computing system 100 that uses an encrypted binary file 135 to configure a hardware card 165, according to an example. The computing system 100 includes a processor 102, a host operating system (OS) 105, a link driver 150, and the hardware card 165. In one embodiment, the computing system 100 is a single computer contained within a single body or case. Alternatively, the computing system 100 may include multiple different computers (e.g., multiple different servers, blades, etc.) that are in the same case or in separate cases that are communicatively coupled (e.g., a compute cluster).

The processor 102 represents any number of processing units (e.g., central processing units) that each can contain any number of processing cores. The host OS 105 may be any OS capable of performing the functions described herein when executed by the processor 102. In FIG. 1, the host OS 105 includes multiple virtual machines (VMs) 110 which may be used by different users or customers. The VMs 110 are software emulations of a computer system which provide functionality of a physical computer. To the perspective of the user or customer assigned the VM 110, the VM 110 performs like an actual computer. The host OS 105 includes a hypervisor 145 which serves as the intermediary between the VMs 110 and the hardware elements in the computing system 100 (e.g., the processor 102, the link driver 150, the hardware card 165, physical memory, and the like. The VMs 110 allow multiple different users to share the hardware components in the computing system 100. The hypervisor 145 and the host OS 105 prevent the VMs 110 from accessing the data in other VMs (assuming they lack the requisite permissions) and from performing any unwanted or malicious actions on the underlying hardware in the computing system 100.

Each of the VMs 110 includes a guest OS 115. In FIG. 1, the guest OS 115A for the VM 110A includes an application 120, design code 125, and a compiler 130. The application 120 (e.g., a software application) provides a runtime environment for the guest OS 115 to communicate with the link driver 150. Put differently, the application 120 enables the guest OS 115A to configure the hardware card 165 to perform a specific function. Moreover, once configured, the application 120 submits jobs to the hardware card 165 which then returns processed data. For example, if the hardware card 165 is a neural network accelerator, the application 120 (e.g., a neural network application) can submit images to the hardware card 165 which are then processed and returned.

The design code 125 may be any high-level code representing the desired configuration of the hardware card. For example, the design code 125 may include a hardware description language (HDL) or a netlist which describes the various components (and their interconnection) needed for the hardware card 165 to perform the specialized function. For example, the design code 125 can configure the hardware card into a neural network accelerator or a graphics accelerator. In one embodiment, the guest OS 115 may include a design program—e.g., a synthesis and analysis tool—for generating the design code 125. However, in other example, the design code 125 may be generated using a different computing system and then downloaded into the computing system 100.

The compiler 130 uses the design code 125 to generate a binary file 135. In one embodiment, before generating the binary file 135, the compiler 130 generates a bit stream (also referred to as a bit file (.bit)) from the design code 125. The bit stream includes the data that configures programmable logic 170 in the hardware card 165 to perform the specialized task. In other words, the bit stream defines the hardware configuration of the hardware card 165. Unlike the design code which includes high-level code, the bit stream includes low-level data which can be provided to the hardware card 165 to configure the circuitry in the programmable logic 170.

The programmable logic 170 can include logic cells, support circuits, and programmable interconnects. The logic cells may include circuits that can be configured to implement general logic functions of a plurality of inputs. The support circuits include dedicated circuits, such as transceivers, input/output blocks, digital signal processors, memories, and the like. The logic cells and the support circuits can be interconnected using the programmable interconnect. Information for programming the logic cells, for setting parameters of the support circuits, and for programming the programmable interconnect may be stored in a configuration memory by configuration logic. The configuration logic can obtain the configuration data from the binary file 135 and more specifically, from the bit stream.

As shown, the binary file 135 which, in one embodiment, is formatted according to an accelerator and linker format and includes encryption data 140. In one embodiment, when compiling the design code 125, the compiler 130 generates encryption data 140 which is inserted into the binary file 135 along with the bit stream. The encryption data 140 secures the binary file 135 to ensure that an unauthorized user cannot change the configuration of the hardware card 165 or harm the link driver 150. Because the computing system 100 permits multiple users (or customers) of the VMs 110 to access the link driver 150 in order to use the hardware card 165, the embodiments herein provide techniques for ensuring that an unauthorized user does not gain access to the hardware in the computing system 100. For example, an unauthorized user may break the link 160 between the link driver 150 and the hardware card 165 (thereby preventing other users from accessing the hardware card 165) or change the configuration of the programmable logic 170.

In one embodiment, the VMs 110 may share the programmable logic 170. For example, each VM 110 (i.e., each user) may be assigned a portion of the programmable logic 170. The VM 110A may configure its portion to be a neural network accelerator while VM 110B configures its portion to be a graphics accelerator. If the binary files 135 are not encrypted or secured, a unauthorized user may submit a binary file that shuts down the link 160 preventing all of the VMs 110 from accessing the hardware card 165, change the configuration of a portion (or all) of the programmable logic 170, or corrupt the memory elements in the hardware card 165.

The binary files 135 include the encryption data 140 which permits the computing system 100 to validate the binary file 135. In this example, the link driver 150 includes a validator 155 which evaluates the encryption data 140 to determine that the binary file 135 was generated by an authorized user and was not tampered with. For example, if only VM 110A is permitted to access the hardware card 165, but VM 110B submits a binary file, the validator 155 determines the file was submitted by an unauthorized user and does not forward the binary file to the hardware card 165. However, if the validator 155 validates the binary file 135, the link driver 150 forwards the configuration information in the binary file 135 (e.g., the bit stream) to the hardware card 165.

The link driver 150 facilitates communication between the host OS 105 and the hardware card 165. In one embodiment, the link driver 150 is a PCIe driver and the link 160 is a PCIe link which provides a communication channel between the link driver 150 and the hardware card 165. In one embodiment, the hardware card 165 is a peripheral device that is plugged into an expansion slot of a printed circuit board (not shown) coupled to one end of the link 160 while the link driver 150 is connected to the other end of the link 160.

In one embodiment, the hardware card 165 includes a FPGA. However, the embodiments are not limited to such. Instead, the hardware card 165 can be any hardware card to include logic or integrated circuit that is configurable (or programmable) to perform a specific function. In one embodiment, the hardware card 165 is removable from the computing system 100. For example, the hardware card 165 can be plugged into the computing system 100. If the hardware card 165 malfunctions, the card 165 can be easily removed and replaced.

The programmable logic 170 may be disposed on one or more programmable integrated circuits (not shown) and can be configured using the bit stream generated from the design code 125. The programmable integrated circuits are not limited to an FPGA and can be a system-on-a-programmable-chip, system-on-a-chip (SOC), or complex programmable logic devices. The FPGA or SOC may contain static regions, programmable regions (e.g., configurable logic blocks), memory (e.g, RAM), digital signal processing elements, and the like.

Although FIG. 1 illustrates the compiler 130 generating the encryption data 140, in other embodiments, the encryption data 140 is generated elsewhere and is then inserted into the binary file 135 after compilation. For example, the application 120 may generate the encryption data 140 which is then added to the binary file 135 later. In another example, the hypervisor 145 provides a utility for generating the encryption data 140 at a remote server and then inserting the encryption data 140 into the binary file 135 before the file is forwarded to the link driver 150 (or other hardware in the computing system 100). In this example, the remote server may be an authentication server which stores the permissions for the VMs 110 and the corresponding users.

In addition, the validator 155 may be disposed at different locations in the computing system 100. For example, the host OS 105 may execute a runtime environment which permits the VMs 110 to communicate with the link driver 150. The validator 155 may be part of this runtime environment to ensure that the binary files 135 received from the VMs 110 are valid. In another example, when receiving the binary files 135 from the VMs 110, the hypervisor 145 may forward the binary files 135 to an external validation server which performs the validation. If valid, the external server can provide an indication to the hypervisor 145 which then forwards the binary file 135 to the link driver 150.

Figure 2:
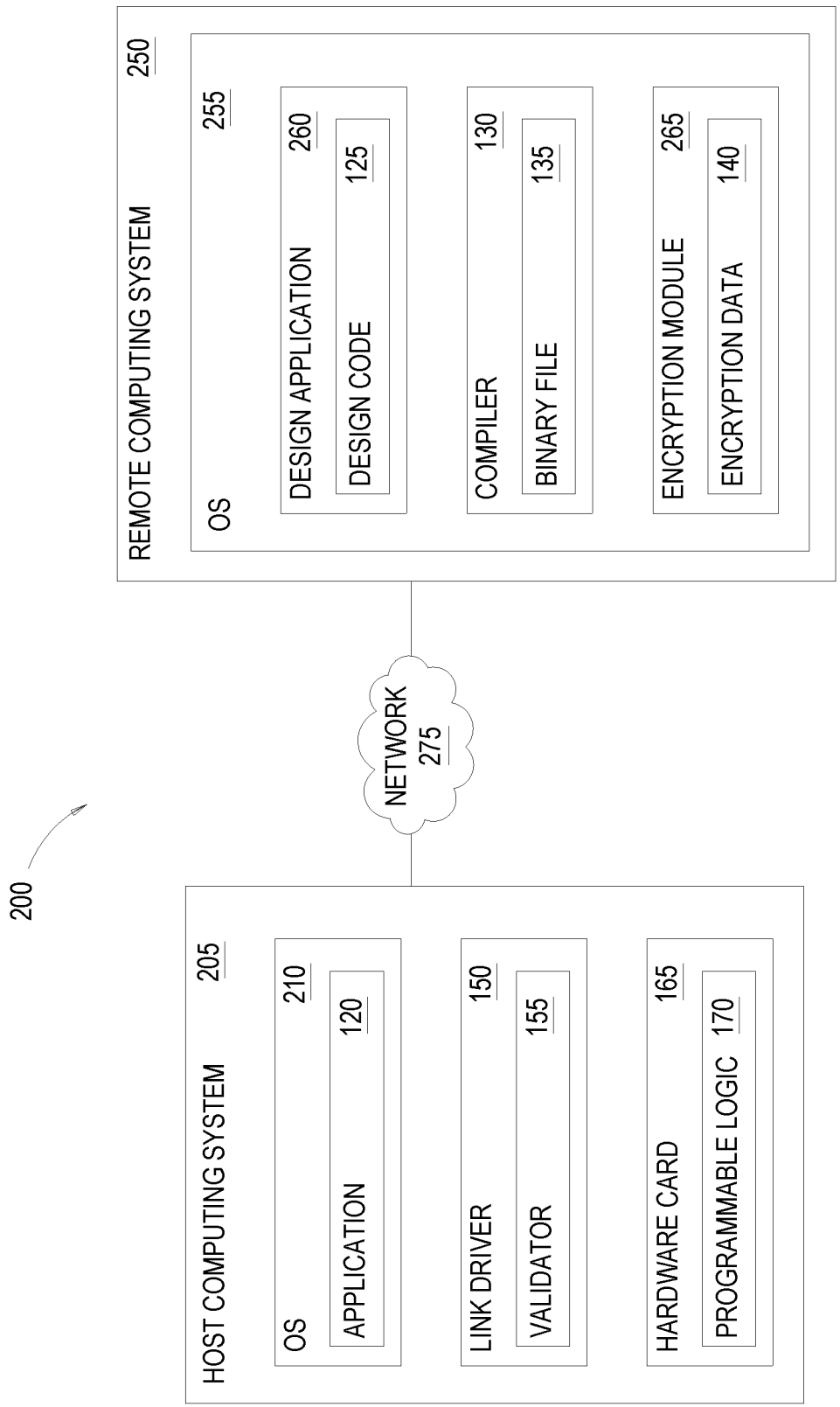
FIG. 2 is a block diagram of a remote computing system that provides an encrypted binary file to a host computing system for configuring a hardware card, according to an example.

FIG. 2 is a block diagram of a system 200 including a remote computing system 250 that provides an encrypted binary file to a host computing system 205 for configuring the hardware card 165, according to an example. Unlike in FIG. 1, in this example, the binary file 135 is generated on the remote computing system 250 rather than on the same host computing system 205 which includes the hardware card 165. As shown, the remote computer system 250 includes an OS 255 which in turn includes a design application 260, the compiler 130, and an encryption module 265.

The design application 260 may be a software application that permits a system designer to generate the high-level design code 125 for configuring the programmable logic 170 in the hardware card 165. For example, the design application 260 may provide an interface for generating the HDL or a netlist representing the design code 125. Because generating the design code 125 and executing the compiler 130 can take significant amounts of compute processing power, the remote computer system 250 may include a compute cluster which generates the design code 125 and the binary file 135. For example, the remote computing system 250 may be able to generate the design code 125 and the binary file 135 in a fraction of the time that it would take to generate this data using the host computing system 205.

The encryption module 265 (e.g., a software application) generates the encryption data 140 which is inserted into the binary file 135. In one embodiment, the encryption data 140 is generated by a different remote computing system (e.g., an authentication server) and then sent to the remote computing system 250.

Using a network 275 (e.g., a local area network or a wide access network), the remote computing system 250 transmits the encrypted binary file 135 to the host computing system 205. In one embodiment, slots in a motherboard in the host computing system 205 (e.g., a PCIe slot) can be used to transfer the binary file 135 received from the remote computing system 250 to the application 120. The application 120 forwards the binary file 135 to the validator 155 in the link driver 150 to verify that the binary file 135 originated from an authorized user and that the file 135 has not been tampered with. Although the validator 155 is shown as part of the link driver 150 (e.g., a PCIe driver), the validator 155 may be part of the OS 210 or in a remote authentication server. Once verified, the link driver 150 forwards at least a portion of the binary file 135 to the hardware card 165 to configure the programmable logic 170.

Figure 3:
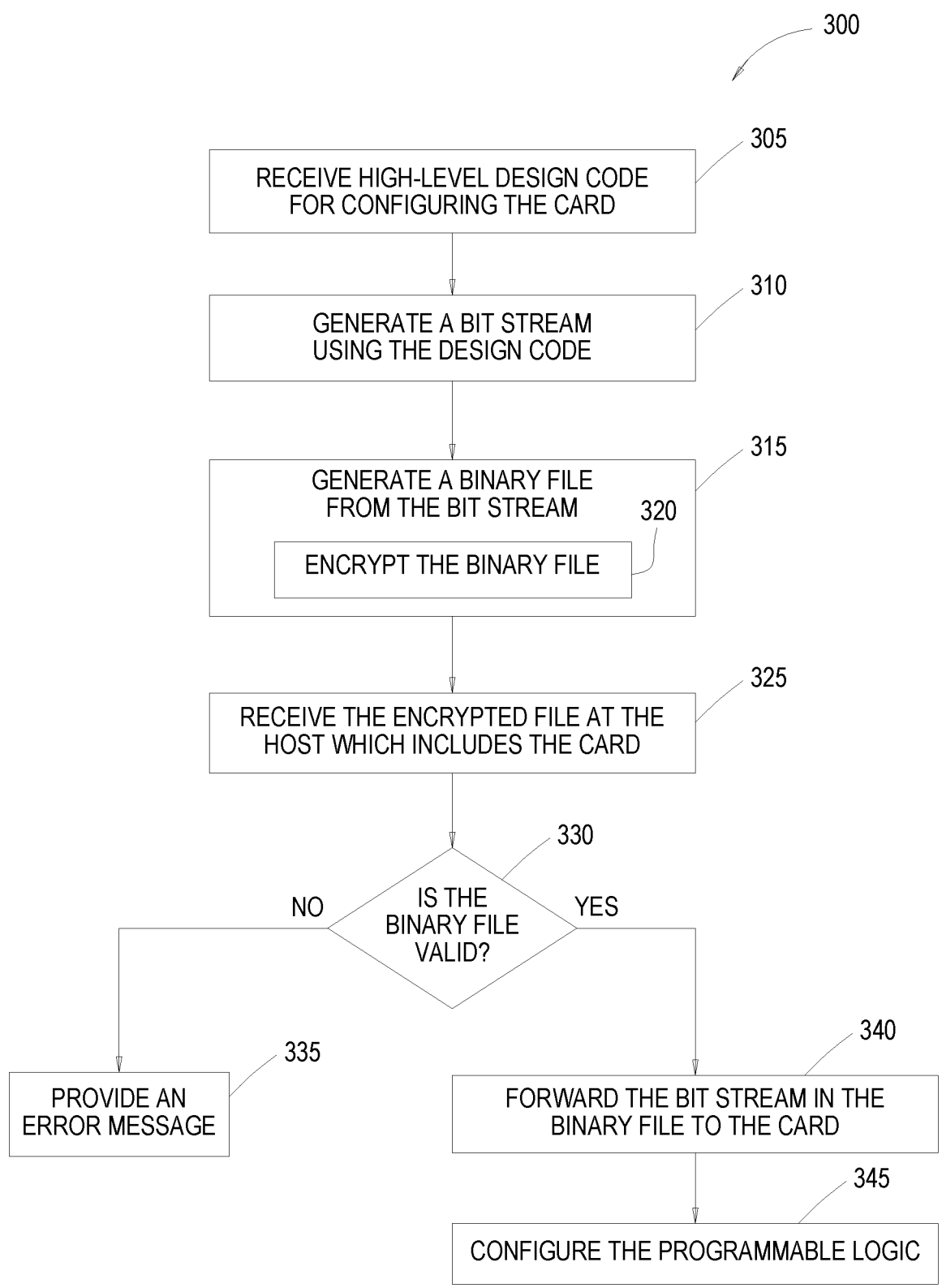
FIG. 3 is a flowchart for encrypting and validating a binary file for configuring a hardware card, according to an example.

FIG. 3 is a flowchart of a method 300 for encrypting and validating a binary file for configuring a hardware card, according to an example. At block 305, a computing system receives or generates the high-level design code for configuring the hardware card. As mentioned above, the high-level design code may be generated using the computing system that hosts the hardware card or can be generated on a remote computing system.

At block 310, a compiler generates a bit stream using the design code. The bit stream includes the information used to configure at least a portion of the programmable logic in the hardware card. For example, the hardware card may be used by multiple users. As such, each user may generate a different bit stream which configures an assigned sub-portion of the programmable logic in the hardware card. Once configured, the users can use independent time slices to access and execute the assigned sub-portions to perform tasks—e.g., encryption/decryption, image processing using machine learning, graphics generation, and the like.

At block 315, the compiler generates a binary file from the bit stream. For example, in addition to containing the bit stream, the compiler may generate a header for the binary file, wipe instructions for clearing (or deleting) previous configurations of the hardware card, and debugging data for identifying problems in the bit stream or hardware card.

Also, when generating the binary file, at block 320, the compiler encrypts the binary file. Although the details of encrypting the binary file are described below, in one embodiment the binary file inserts encryption data (e.g., a cipher and a key block) into the binary file. Which in one embodiment the compiler generates the encryption data, in other embodiments a separate encryption module or a remote authentication server generates the encryption data.

In one embodiment, the encryption data is inserted into the binary file after the compiler generates the binary file. That is, the compiler may leave space in the binary file for the encryption data. Later, when the encryption data is generated or received, the encryption module can insert the encryption data into the binary file. In one embodiment, the encryption data is inserted into the binary file before the binary file is forwarded to the hardware in the computing system that includes the hardware card. For example, the encryption data may be inserted before a hypervisor transmits the binary file to the link driver or before a remote computing system transmits the binary file to the host computing system.

At block 325, the validator receives the encrypted binary file at the host computing system which contains the hardware card. The validator uses the encryption data in the binary file to validate the contents of the file. In one embodiment, the validator ensures that the binary file was generated by an authorized user and that the binary file was not altered by an unauthorized user after being generated by the authorized user. For example, when being transmitted from a remote computing system to the host computing system, an intermediary party may have intercepted the binary file and altered its contents before transmitting the now altered binary file to the host computing system.

If at block 330 the validator determines the binary file is not valid, the method 300 proceeds to block 335 where the validator provides an error message. For example, the error message may be transmitted to the customer or user that submitted the binary file as well to the system administrator of the host computing system. The error message may inform the customer and the system administrator of a potential security threat. Moreover, the validator prevents the link driver from forwarding the information in the binary file to the hardware card.

If at block 330 the validator validates the binary file, the method 300 proceeds to block 340 where the link driver forwards the bit stream in the binary file to the hardware card. In this example, the validation is performed before the data within the binary file is forwarded to the hardware card. Further, in another embodiment, the validation is performed before the link driver processes the binary file. For example, if malicious data was inserted into the binary file, the data may harm or deactivate the link driver. As such, the validator may evaluate the binary file before the file is actively processed by the link driver and forwarded to the hardware card.

Moreover, the link driver may forward additional information to the hardware card than just the bit stream. In one embodiment, the link driver may forward all of the contents of the binary file (except for the encryption data) to the hardware code which can include wipe instructions and debugging data.

At block 345, the hardware card configures the programmable logic using the bit stream. As mentioned above, the configuration of the programmable logic varies depending on the specific task the customer wants the hardware card to perform—e.g., a specific type of accelerator. Once configured, the customer can submit tasks to the hardware card which performs the tasks and forwards processed data back to the customer. Using method 300, a computing system can ensure that binary files used to configure a hardware card (which can be submitted by multiple users) are valid.

Figure 4:
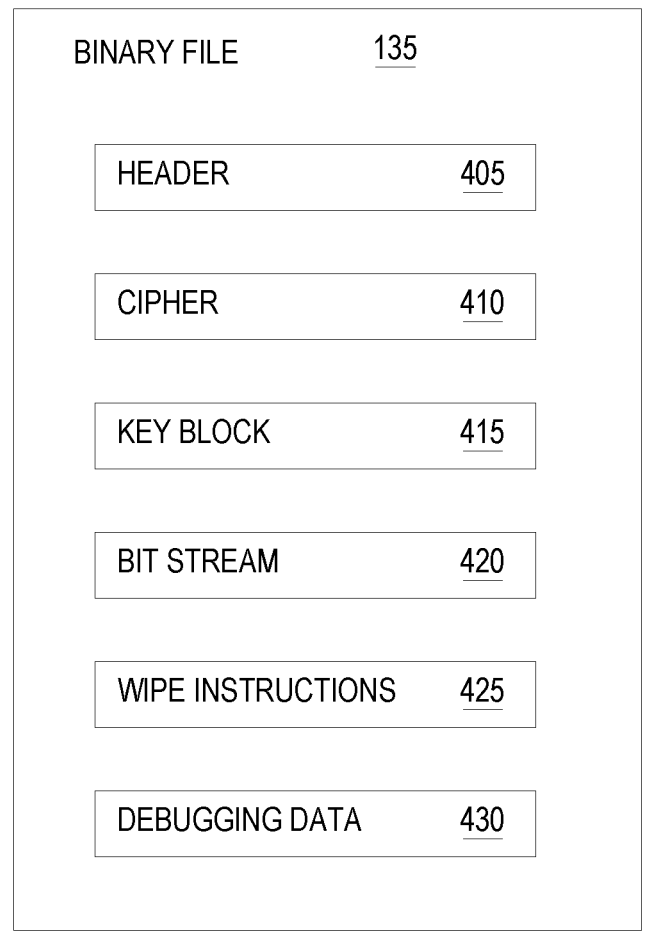
FIG. 4 is a block diagram of an encrypted binary file, according to an example.

FIG. 4 is a block diagram of an encrypted binary file 135, according to an example. As shown, the binary file 135 includes a header 405, a cipher 410, a key block 415, a bit stream 420, wipe instructions 425, and debugging data 430. The header 405 can include data used by the runtime environment in the host computing system to parse or walk through the binary file 135. For example, the header 405 may include offset information to indicate the location of the various different types of data in the binary file 135 (e.g., the locations of the cipher 410, the key block, the bit stream 420, the wipe instructions 425, etc.).

In one embodiment, the cipher 410 is a checksum generated by performing a checksum operation on the data in the binary file 135. For example, after the bit stream 420 is generated, the compiler may use a hash message authentication code (HMAC) algorithm to generate the cipher 410 from the bit stream 420 and a randomly generated session key. If the data used to generate the cipher 410 is altered or changed (e.g., if an unauthorized user changes the bit stream 420), re-calculating the cipher 410 results in a different value. Thus, in one example, the cipher 410 can be used to detect if an unauthorized user altered the data in the binary file 135 after it was generated.

In one embodiment, the key block 415 includes a session key. In one embodiment, the compiler or encryption module generates the key block 415 using a private key. As described later, a recipient of the binary file 135 can use a public key to decrypt the key block 415, and thus, determine if the binary file 135 was generated by an authorized user (i.e., someone who has the private key). The private and public keys can be referred to as predefined encryption keys.

The bit stream 420 includes data necessary to configure programmable logic in the hardware code to perform a user-specific task. For example, the compiler may generate the bit stream 420 using high-level design code such as HDL code or a netlist. In one embodiment, the bit stream 420 includes data for programming configurable logic blocks, memory elements, and specialized processing elements (e.g., digital signal processing blocks) in an FPGA.

The wipe instructions 425 clear (or delete) previous configurations of the hardware card. For example, the user may have previously configured the hardware card to perform a first function (e.g., operate as a graphics accelerator) but the bit stream 420 reconfigures the hardware card to perform a second function (e.g., operate as a neural network accelerator). The wipe instructions 425 may indicate what portion of the programmable logic should be used to implement the bit stream 420 and clear the programmable logic and memory elements in that portion. Because other portions in the hardware card may be reserved or assigned to different users, the wipe instructions 425 may clear only some of the programmable logic in the hardware card.

The debugging data 430 can include information for debugging or troubleshooting problems with the bit stream 420 or within the hardware card.

Figure 5:
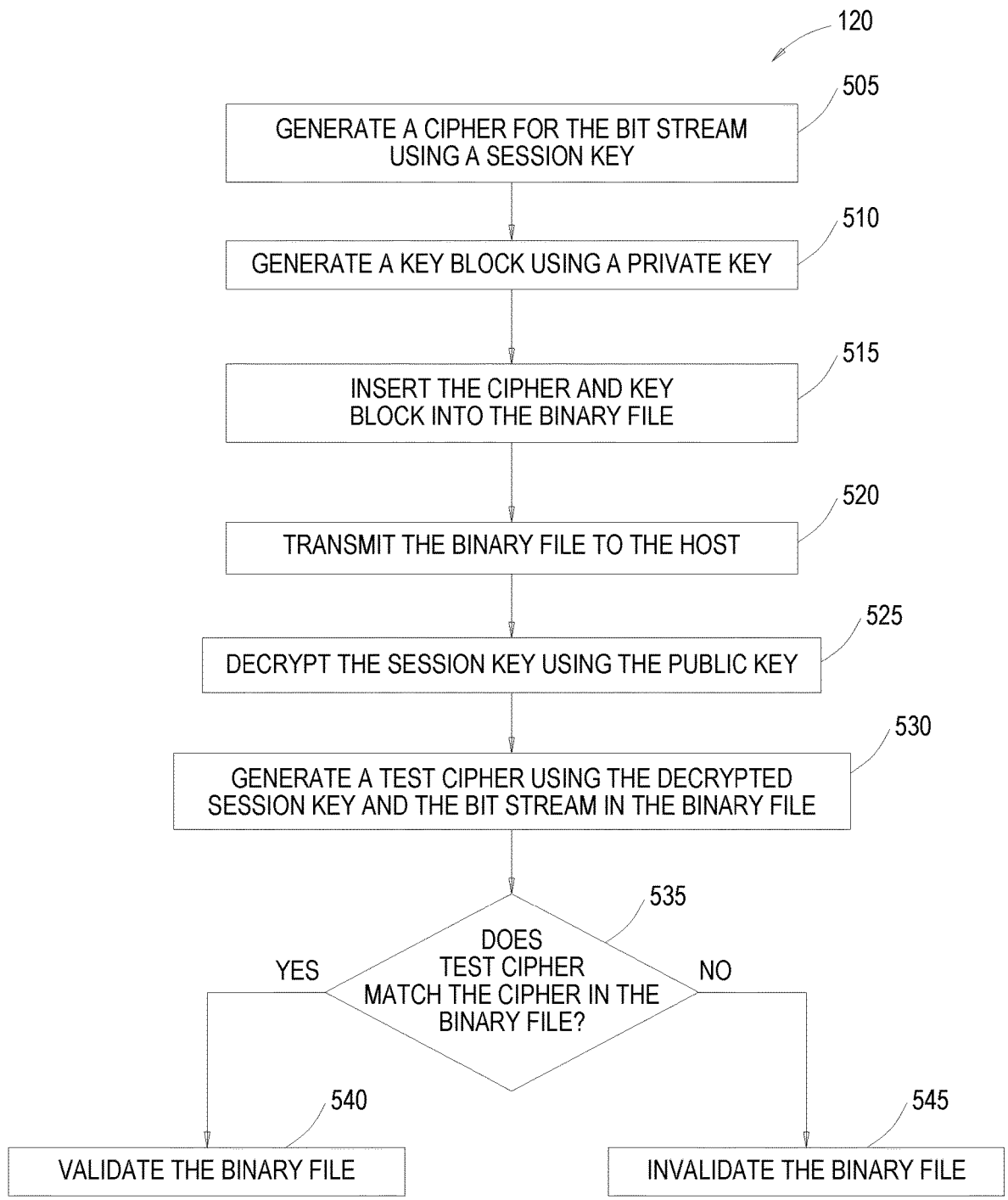
FIG. 5 is a flowchart for encrypting and validating a binary file, according to an example.

FIG. 5 is a flowchart of a method 500 for encrypting and validating a binary file, according to an example. At block 505, the compiler or encryption module generates a cipher for the bit stream using a session key. In one embodiment, the session key is then encrypted using the private key to generate the key block. The session key can be stored in the key block as described below. Moreover, as mentioned above, the cipher can include a checksum which is derived for all or some of the data in the binary file. In one embodiment, the cipher (also referred to as a hash) is generated using a cryptographic hash function such as the MD5 algorithm or Secure Hash Algorithm (SHA). For example, an iterative hash function can break up the bit stream in the binary file into blocks of a fixed size and iterates over them with a compression function. Changing the data in the binary file used to generate the cipher also changes the value of the cipher. In this manner, the cipher can be derived using the session key and the checksum.

At block 510, the compiler or encryption module generates the key block using a private key. In one embodiment, the customer or user who generates the binary file has the private key while the host computing system (or the authentication server) which validates the binary file has the public key. During or after compilations, the customer uses the private key to encrypt the session key and the result is the key block. As described below, only an entity that includes the public key can decrypt the key block.

At block 515, the compiler inserts the cipher and the key block into the binary file. In one embodiment, the compiler inserts the cipher and the key block while generating the binary file—e.g., when inserting other information such as the wipe instructions or the debugging data. In another embodiment, the compiler may reserve space in the binary file for the cipher and the key block. For example, the header for the binary file may indicate a location of the cipher and key block in the binary file even if the cipher and the key block have not yet been generated. Later, the compiler or an encryption module (either local or remote to the compiler) generates the cipher and the key block and then insert this data into the binary file.

At block 520, the binary file is transmitted to the host. In one embodiment, the binary file is generated by, or stored in, a VM executing on the host computing system that includes the hardware card. Using the hypervisor, the VM transmits the binary file to the hardware in the host. In another embodiment, the binary file is transmitted to the host from a remote computing system. For example, a customer may use an application programming interface (API) to transmit the binary file to the host. Alternatively, the binary file may be generated and encrypted using one or more remote computing system (e.g., a computing cluster) which is then transmitted to the host computing system.

At block 525, a validator decrypts the session key using the public key from the key block. In one embodiment, the validator is disposed on the host computing system. In another embodiment, the host computing system may transmit the binary file to a validation server or other decryption service which validates the binary file.

At block 530, the validator generates a test cipher using the session key decrypted from the key block and the bit stream in the binary file. In one embodiment, the validator use the same process or technique (e.g., the same hashing function) the compiler or encryption module used to generate the cipher inserted into the binary file to generate the test cipher. Put differently, the validator can recalculate the cipher using the decrypted key block and other data in the binary file (e.g., the bit stream, the wipe instructions, the debugging data, and the like).

If at block 535 the test cipher matches the cipher in the binary file, the method 500 proceeds to block 540 where the validator validates the binary file. In one embodiment, the link driver then forwards the bit stream and other data in the binary file to the hardware card as described above.

However, if at block 535 the ciphers do not match, the method 500 proceeds to block 545 where the validator invalidates the binary file. For example, if the key block was not generated by a user who has the correct private key, the validator can determine when decrypting the key block that it was not generated by an authorized user. Further, if the data in the binary file used to generate the cipher was altered, then the test cipher will not match the cipher in the binary file. Thus, the validator can determine that the binary file was tampered with, and thus, not validate the binary file. As mentioned above, the validator may inform the customer or the system administrator that a binary file was invalidated and that there may be a security threat.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware embodiment, an entirely software embodiment (including firmware, resident software, micro-code, etc.) or an embodiment combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method comprising:
receiving, at a validator of a link driver, an encrypted binary file from an operating system, the binary file comprising a header, encryption data, and a bit stream, wherein the header indicates respective locations of the encryption data and the bit stream within the binary file;
decrypting the encryption data at the validator, wherein the encryption data comprises a first cipher and a key block and decrypting the encryption data comprises:
decrypting a session key from the key block using a predefined encryption key;
generating a test cipher using the decrypted session key and the bit stream; and
upon determining that the test cipher matches the first cipher, validating the binary file; and
upon determining at the validator that the binary file was generated by an authorized user:
transmitting the binary file to a hardware card coupled to the link driver; and
configuring hardware logic in the hardware card based on the bit stream after determining the binary file was generated by the authorized user.

2. The method of claim 1, wherein the hardware logic includes programmable logic that is configured using the bit stream.

3. The method of claim 2, wherein the hardware card comprises a programmable integrated circuit that includes the programmable logic.

4. The method of claim 1, wherein the test cipher is generated using a same hashing function as the first cipher in the binary file.

5. The method of claim 1, wherein receiving the encrypted binary file comprises:
receiving the encrypted binary file from one of a plurality of virtual machines (VMs) executing on the host computing system, wherein each of the plurality of VMs are assigned to respective users.

6. The method of claim 5, wherein each of the plurality of virtual machines have permission to submit a respective binary file for configuring at least a portion of the hardware logic in the hardware card.

7. The method of claim 1, the hardware card is a peripheral device that is plugged into the host computing system.

8. A host computing system, comprising:
an operating system;

a hardware card comprising hardware logic; and a link driver coupled to the hardware card, the link driver comprising a validator configured to:

receive an encrypted binary file from the operating system, the binary file comprising a header, encryption data, and a bit stream, wherein the header indicates respective locations of the encryption data and the bit stream within the binary file;

decrypt the encryption data, wherein the encryption data comprises a first cipher and a key block and when, decrypting the encryption data, the validator is configured to:

decrypt a session key from the key block using a predefined encryption key;

generate a test cipher using the decrypted session key and the bit stream; and upon determining that the test cipher matches the first cipher, validate the binary file; and upon determining the binary file is was generated by an authorized user, transmit the binary file to the hardware card, wherein the hardware logic is configured based on the bit stream after the binary file was generated by the authorized user.

9. The host computing system of claim 8, wherein the hardware logic includes programmable logic that is configured using the bit stream and wherein the hardware card comprises a programmable integrated circuit that includes the programmable logic.

10. The host computing system of claim 8, wherein the validator is configured to generate the test cipher using a same hashing function that was used to generate the first cipher in the binary file.

11. The host computing system of claim 8, wherein, when receiving the encrypted binary file, the validator is configured to:

receive the encrypted binary file from one of a plurality of VMs executing on the host computing system, wherein each of the plurality of VMs are assigned to respective users.

12. The host computing system of claim 11, wherein each of the plurality of VMs have permission to submit a respective binary file for configuring at least a portion of the hardware logic in the hardware card.

13. A non-transitory computer readable storage medium comprising:

computer-readable program code for verifying an encrypted binary file, wherein, when executed by a computing processor, the computer-readable program code performs an operation comprising:

receiving, at a validator of a link driver, the binary file from an operating system of a host computing system, the binary file comprising a header, encryption data, and a bit stream, wherein the header indicates respective locations of the encryption data and the bit stream within the binary file;

decrypting the encryption data at the validator, wherein the encryption data comprises a first cipher and a key block and decrypting the encryption data comprises:

decrypting a session key from the key block using a predefined encryption key;

generating a test cipher using the decrypted session key and the bit stream; and upon determining that the test cipher matches the first cipher, validating the binary file; and upon determining at the validator that the binary file is was generated by an authorized user:

transmitting the binary file to a hardware card coupled to the link driver; and configuring hardware logic in the hardware card based on the bit stream after the binary file was generated by the authorized user.

14. The non-transitory computer readable storage medium of claim 13, wherein the hardware logic includes programmable logic that is configured using the bit stream and wherein the hardware card comprises a programmable integrated circuit that includes the programmable logic.

15. The non-transitory computer readable storage medium of claim 13, wherein the test cipher is generated using a same hashing function as the first cipher in the binary file.

16. The non-transitory computer readable storage medium of claim 13, wherein receiving the encrypted binary file comprises:

receiving the encrypted binary file from one of a plurality of virtual machines (VMs) executing on the host computing system, wherein each of the plurality of VMs are assigned to respective users.

17. The non-transitory computer readable storage medium of claim 16, wherein each of the plurality of virtual machines have permission to submit a respective binary file for configuring at least a portion of the hardware logic in the hardware card.

* * * * *

UNITED STATES PATENT AND TRADEMARK OFFICE
CERTIFICATE OF CORRECTION

PATENT NO. : 11,042,610 B1
APPLICATION NO. : 15/724942
DATED : June 22, 2021
INVENTOR(S) : Hem Neema, Sonal Santan and Bin Ochotta It is certified that error appears in the above-identified patent and that said Letters Patent is hereby corrected as shown below:

In the Claims

Column 13, Line 19, In Claim 8, delete "is was" and insert -- was --, therefor.

Column 14, Line 19-20, In Claim 13, delete "is was" and insert -- was --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*